June 9, 1931.  C. P. WAGNER ET AL  1,809,225
FLOUR SAVING MEANS FOR DOUGH BRAKES
Filed Jan. 6, 1931   2 Sheets-Sheet 1
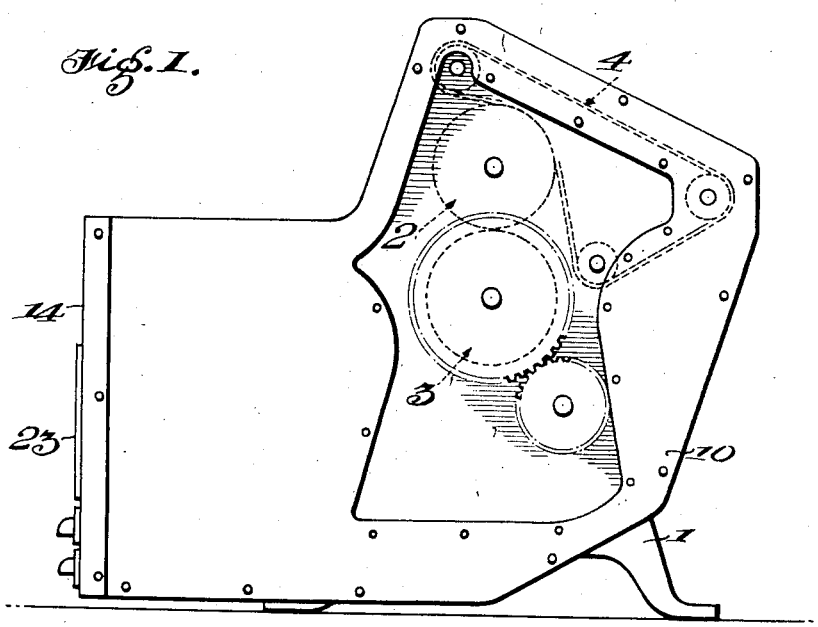
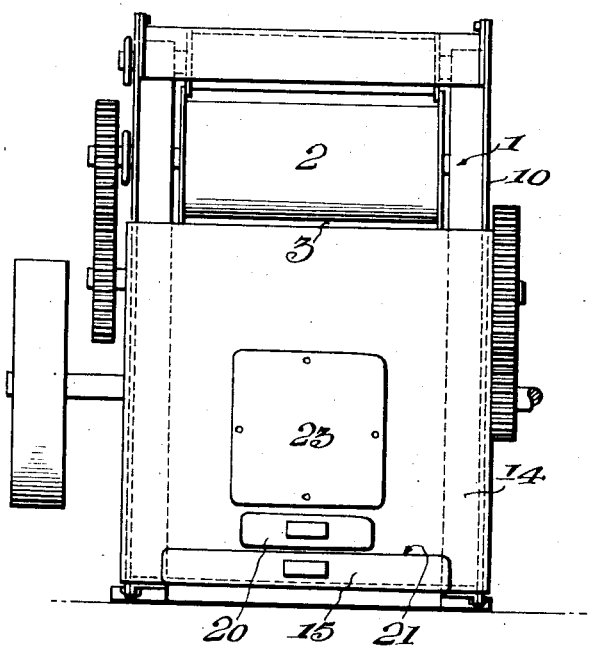
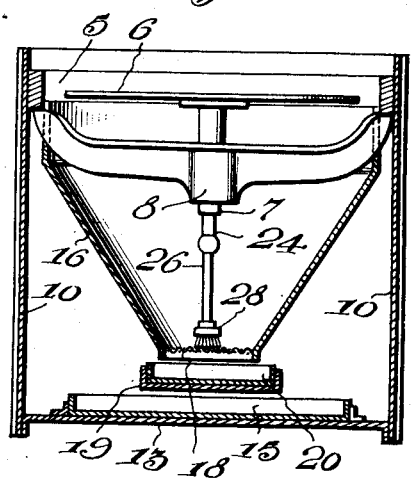
INVENTORS
CHARLES P. WAGNER
WILTZ W. WAGNER
BY Baldwin + Wight
ATTORNEYS June 9, 1931.  C. P. WAGNER ET AL  1,809,225
FLOUR SAVING MEANS FOR DOUGH BRAKES
Filed Jan. 6, 1931  2 Sheets-Sheet 2
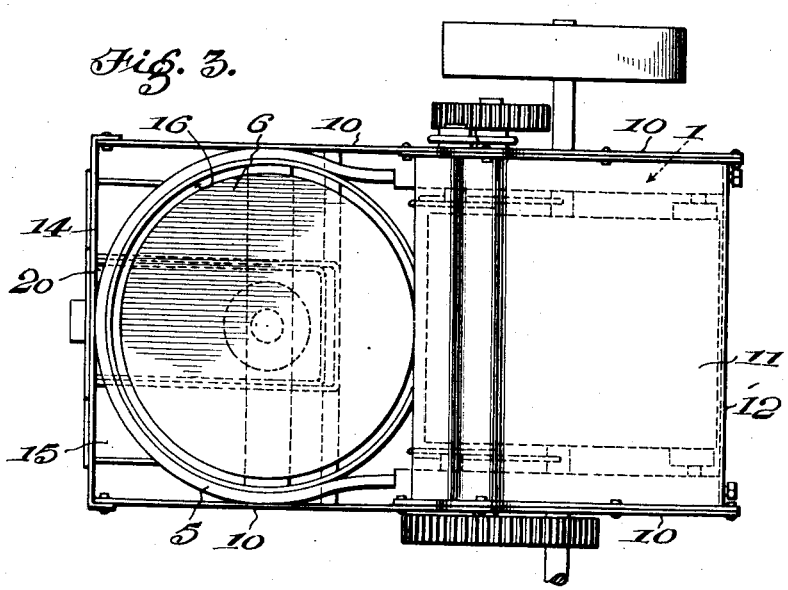
INVENTORS
CHARLES P. WAGNER
WILTZ W. WAGNER
BY Baldwin & Wight
ATTORNEYS Patented June 9, 1931

1,809,225

UNITED STATES PATENT OFFICE

CHARLES P. WAGNER AND WILTZ W. WAGNER, OF NEW ORLEANS, LOUISIANA

FLOUR SAVING MEANS FOR DOUGH BRAKES

Application filed January 6, 1931. Serial No. 506,987.

The invention generally relates to dough brakes and primarily has for its object to provide novel means for collecting and saving the dusting flour usually wasted during the operation of such machines.

In machines of the character described it is customary to provide certain coacting rollers or turntables or both for receiving the dough being worked. In order to prevent sticking of the dough to these devices a considerable quantity of dusting flour is used and since a small portion only of this flour is worked up into the dough the major portion falls to the floor and is wasted.

It is therefore an object of our invention to provide a novel waste flour collecting shell encasing portions of the machine in a manner for effectively collecting and saving the heretofore wasted dusting flour, there being also provided means for facilitating the removal of the salvaged flour from the shell.

Another object of the invention is to provide, in turntable equipped machines, a specially constructed waste dusting flour collecting hopper to receive the waste flour from the turntable and deliver it through a screen bottom into a receiving box wherein is provided a removable pan or drawer, there being also provided hopper wall and screen bottom scraping devices movable upon movement of the turntable to facilitate delivery of the collected waste flour into the hopper box.

Another object of the invention is to combine the machine encasing shell and the turntable associated hopper in cooperative relation.

Other objects will in part be obvious and in part be pointed out hereinafter.

To the attainment of the aforesaid objects and ends, the invention still further resides in the novel details of construction, the combination and arrangement of parts, all of which will be first fully described in the following detailed description, then be particularly pointed out in the appended claims, reference being had to the accompanying drawings, in which:—

Figure 1 is a side elevation of a machine equipped with the invention;

Figure 2 is a central vertical longitudinal section;

Figure 3 is a plan view;

Figure 4 is an end elevation;

Figure 5 is a vertical cross section taken through the position of the hopper.

In the drawings in which like numerals of reference indicate like parts in all of the figures, 1 generally designates the frame of a dough brake of a conventional form in which is provided the usual coacting rollers 2 and 3 and the cooperating belt 4. As is customary the frame also includes a forwardly extended open flange 5 within which the usual turntable 6 is mounted with its depending vertical shaft 7 having free rotation bearing as at 8 in the cross web supported by the flange 5.

All of the above-mentioned structure is conventional and forms no part of my present invention. Machines of this general type are exemplified in the patent to Bohnet 1,551,131. In this disclosure, however, the power applying devices for rotating the turntable are omitted for the purposes of simplicity and the desirability of illustrating the invention in its simplest form, that is mounted on a machine in which the turntable is rotated by hand. In carrying out our invention we have provided side shell sections 10 which are joined by top, back, bottom and front shell body sections designated 11, 12, 13 and 14 respectively, and which, together with the sides, form a dusting flour catching or collecting encasement for the machine frame 1.

The front body section 14 is provided with an opening to accommodate the mounting and removal of a flour receiving and removing drawer 15. It will be readily understood that the dusting flour which ordinarily falls from the machine parts onto the floor will be collected by the machine encasement and will be directed into the drawer 15 and be removed when desired.

A frusto-coniformed waste flour hopper 16 is supported as at 17 beneath the flange 5, the receiving or upper end dimensions of the hopper being sufficiently large to receive all of the waste flour which falls over the peripheral edge of the turntable 6. At its lower end the hopper 16 delivers, through a screen bottom 18 into a receiving box 19 in which is positioned a removable drawer 20, the latter serving to receive the waste flour collected by the hopper and being readily removable to facilitate the reclaiming of the waste flour. The drawer 20 is removable through a door or opening 21 in the front body 14.

The hopper 16 is provided with a removable wall section 22 so that access may be had to the interior thereof and this wall section 22 is in turn accessible through the inspection door 23 with which the front section 14 is provided.

The lower end of the shaft 7, which extends below the bearing 8, is provided with a vertical threaded bore to receive the upper threaded end of a vertical shaft section 24 which carries the horizontal arm 25 and the angularly downwardly directed vertical arm 26. Each of the arms 25 and 26 carries a brush 27, said brushes being designated 27 and 28 respectively. It will be obvious that as the turntable is rotated the brush 27 will scrape the inside of the hopper wall and the brush 28 will scrape over the screen bottom 18, thus assuring proper delivery of the collected waste flour into the drawer 20.

It is well known that in the use of dough brakes the operator frequently deposits handfuls of dusting flour to overcome the tendency of the dough to adhere to the turntable. This practice occasions much waste of dusting flour in view of the fact that heretofore no means has been provided for reclaiming the waste flour which fell from the machine onto the floor. The advantages of our machine frame encasing shell and the novel collecting hopper beneath the turntable will therefore be obvious to those skilled in the art to which the invention relates.

While we have illustrated a form of means for accomplishing the purposes stated, it is obvious that the details of construction may be varied considerably within the scope of the invention as pointed out in the appended claims.

We claim:

1. In a machine of the character described wherein is provided a dough receiving turntable, a waste dusting flour hopper mounted beneath the turntable, hopper wall scraping means operated by the turntable and means to withdraw from the hopper the waste flour received therein.

2. In a machine of the character described wherein is provided a dough receiving turntable, a waste dusting flour hopper mounted beneath the turntable, said hopper having a screen bottom, a receiving box into which said hopper delivers through said screen, and a waste flour receiving and removing drawer mounted in and removable from the box.

3. In a machine of the character described wherein is provided a dough receiving turntable, a waste dusting flour hopper mounted beneath the turntable, said hopper having a screen bottom, a receiving box into which said hopper delivers through said screen, an agitator movable over the screen by movement of the turntable, and a waste flour receiving and removing drawer mounted in and removable from the box.

4. In a machine of the character described wherein is provided a dough receiving turntable, a waste dusting flour hopper mounted beneath the turntable, said hopper having a screen bottom, a receiving box into which said hopper delivers through said screen, an agitator movable over the screen by movement of the turntable, hopper wall scraping means operated by the turntable, and a waste flour receiving and removing drawer mounted in and and removable from the box.

5. In a machine of the character described wherein is provided a frame and coacting dough engaging devices including a turntable having a depending shaft rotatable in a bearing supported by the frame, a waste dusting flour hopper mounted beneath the turntable said hopper having a screen bottom, a receiving box into which said hopper delivers through said screen, hopper wall and screen scraping devices supported by and rotatable with said depending shaft, and a waste flour receiving and removing drawer mounted in and removable from the box.

6. In a machine of the character described wherein is provided a frame and coacting dough engaging devices including a turntable having a depending shaft rotatable in a bearing supported by the frame, a waste dusting flour hopper mounted beneath the turntable, said hopper having a screen bottom, a receiving box into which said hopper delivers through said screen, hopper wall and screen scraping devices supported by and rotatable with said depending shaft, a waste flour receiving and removing drawer mounted in and removable from the box, a waste dusting flour collecting shell encasing portions of the machine and the hopper, and a waste flour receiving drawer disposed beneath the hopper receiving box and supported within and removable from the shell for the purpose of receiving and removing the waste flour collected by the shell.

7. In a machine of the character described wherein is provided a frame and coacting dough engaging devices including a turntable having a depending shaft rotatable in a bearing supported by the frame, a waste dusting flour hopper mounted beneath the turntable, said hopper having a screen bottom, a receiving box into which said hopper delivers through said screen, hopper wall and screen scraping devices supported by and rotatable with said depending shaft, a waste flour receiving and removing drawer mounted in and removable from the box, a waste dusting flour collecting shell encasing portions of the machine and the hopper, a waste flour receiving drawer disposed beneath the hopper receiving box and supported within and removable from the shell for the purpose of receiving and removing the waste flour collected by the shell, and means removable to gain access to the interior of the hopper for the purpose described.

8. In a machine of the character described wherein is provided means for acting upon material to which dusting powder is administered, means to salvage surplus dusting powder comprising a hopper for collecting surplus dusting powder within the confines of the machine, hopper wall scraping means operatively connected to be driven by a part of said "means for acting on the material", and means to withdraw from the hopper the dusting powder received therein.

9. In a machine of the character described wherein is provided means for acting upon material to which dusting powder is administered, means to salvage surplus dusting powder comprising a hopper for collecting surplus dusting powder within the confines of the machine, said hopper having a screen bottom, a removable receiving drawer into which the hopper delivers through said screen, an agitator movable over the screen, and means operated by a part of said "means for acting on the material" for moving said agitator.

10. In a machine of the character described wherein is provided means for acting upon material to which dusting powder is administered, means to salvage surplus dusting powder comprising a hopper for collecting surplus dusting powder within the confines of the machine, said hopper having a screen bottom, a removable receiving drawer into which the hopper delivers through said screen, an agitator movable over the screen, hopper wall scraping means, and means operated by a part of said "means for acting on the material" for moving said agitator and said hopper wall scraping means.

In testimony whereof, we have hereunto subscribed our names.

CHARLES P. WAGNER.
WILTZ W. WAGNER.